(12) United States Patent
Damberg et al.

(10) Patent No.: US 11,019,311 B2
(45) Date of Patent: May 25, 2021

(54) PROJECTION SYSTEMS AND METHODS

(71) Applicant: MTT Innovation Incorporated, Vancouver (CA)

(72) Inventors: Gerwin Damberg, Vancouver (CA); Eric Jan Kozak, Burnaby (CA); Raveen Kumaran, Burnaby (CA); Anders Ballestad, Vancouver (CA)

(73) Assignee: MTT Innovation Incorporated, Vancouver (CA)

( * ) Notice: Subject to any disclaimer, the term of this patent is extended or adjusted under 35 U.S.C. 154(b) by 0 days.

(21) Appl. No.: 16/799,518

(22) Filed: Feb. 24, 2020

(65) Prior Publication Data

US 2020/0195896 A1 Jun. 18, 2020

Related U.S. Application Data

(63) Continuation of application No. 16/107,860, filed on Aug. 21, 2018, now Pat. No. 10,602,100, which is a continuation of application No. 15/724,141, filed on Oct. 3, 2017, now Pat. No. 10,469,808, which is a continuation of application No. 15/287,390, filed on Oct. 6, 2016, now Pat. No. 9,848,176.

(60) Provisional application No. 62/237,989, filed on Oct. 6, 2015.

(51) Int. Cl.
*H04N 9/31* (2006.01)

(52) U.S. Cl.
CPC .......... *H04N 9/3105* (2013.01); *H04N 9/312* (2013.01); *H04N 9/3111* (2013.01); *H04N 9/3126* (2013.01); *H04N 9/3138* (2013.01); *H04N 9/3167* (2013.01)

(58) Field of Classification Search
CPC .. H04N 9/3105; H04N 9/3111; H04N 9/3126; H04N 9/312; H04N 9/3138; H04N 9/3167
USPC ........................................................ 348/745
See application file for complete search history.

(56) References Cited

U.S. PATENT DOCUMENTS

| | | | |
|---|---|---|---|
| 5,424,863 A * | 6/1995 | Gertel | H04B 10/2572 398/152 |
| 5,818,587 A * | 10/1998 | Devaraj | A61B 5/0088 356/477 |
| 6,406,148 B1 | 6/2002 | Marshall et al. | |
| 7,018,046 B2 | 3/2006 | Childers et al. | |
| 8,157,384 B2 | 4/2012 | Kanai et al. | |
| 8,976,318 B2 | 3/2015 | Guthrie | |
| 9,848,176 B2 | 12/2017 | Damberg et al. | |
| 2005/0190140 A1 | 9/2005 | Asahi et al. | |

(Continued)

FOREIGN PATENT DOCUMENTS

| | | |
|---|---|---|
| EP | 1098536 A2 | 5/2001 |
| WO | 2010125367 A1 | 11/2010 |

(Continued)

*Primary Examiner* — Michael Lee
(74) *Attorney, Agent, or Firm* — Oyen Wiggs Green & Mutala LLP

(57) ABSTRACT

Image display apparatus and methods may use a single imaging element such as a digital mirror device (DMD) to spatially modulate plural color channels. A color channel may include a light steering element such as a phase modulator. Steered light from a light steering element may be combined with or replaced by additional light to better display bright images. These technologies may be provided together or applied individually.

26 Claims, 7 Drawing Sheets

(56) References Cited

U.S. PATENT DOCUMENTS

| | | |
|---|---|---|
| 2006/0033888 A1 | 2/2006 | Deppe et al. |
| 2006/0268241 A1 | 11/2006 | Watson et al. |
| 2007/0252918 A1 | 11/2007 | Furuya et al. |
| 2008/0094426 A1 | 4/2008 | Kimpe |
| 2008/0130463 A1 | 6/2008 | Shimizu et al. |
| 2008/0158263 A1 | 7/2008 | Hui et al. |
| 2009/0002297 A1 | 1/2009 | Sakai et al. |
| 2009/0225234 A1 | 9/2009 | Ward et al. |
| 2010/0277697 A1 | 11/2010 | Duncan et al. |
| 2012/0287098 A1* | 11/2012 | Ito ........................ H04N 13/363 345/208 |
| 2013/0042534 A1 | 2/2013 | Polus |
| 2013/0208328 A1 | 8/2013 | Chae et al. |
| 2014/0240378 A1 | 8/2014 | Fujioka |
| 2014/0268330 A1 | 9/2014 | Perkins |
| 2015/0042895 A1 | 2/2015 | Jannard et al. |
| 2015/0237294 A1 | 8/2015 | Richards |
| 2015/0341609 A1 | 11/2015 | Kilcher et al. |
| 2016/0295178 A1 | 10/2016 | Damberg et al. |
| 2020/0117138 A1* | 4/2020 | Gorny .................. G02B 27/281 |

FOREIGN PATENT DOCUMENTS

| | | |
|---|---|---|
| WO | 2012145200 A1 | 10/2012 |
| WO | 2015054797 A1 | 4/2015 |

\* cited by examiner

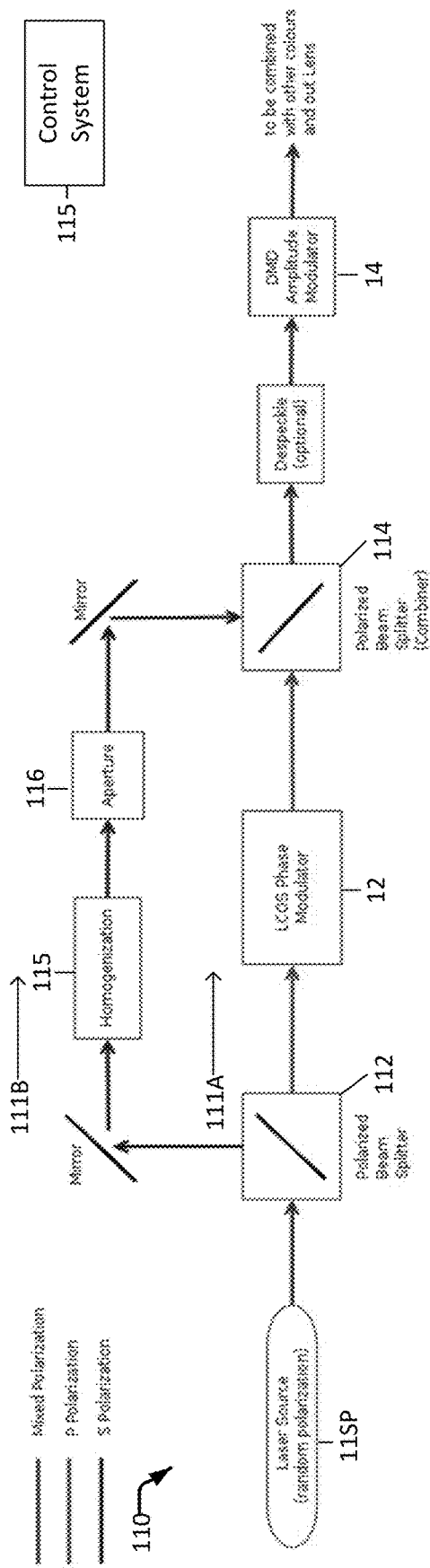
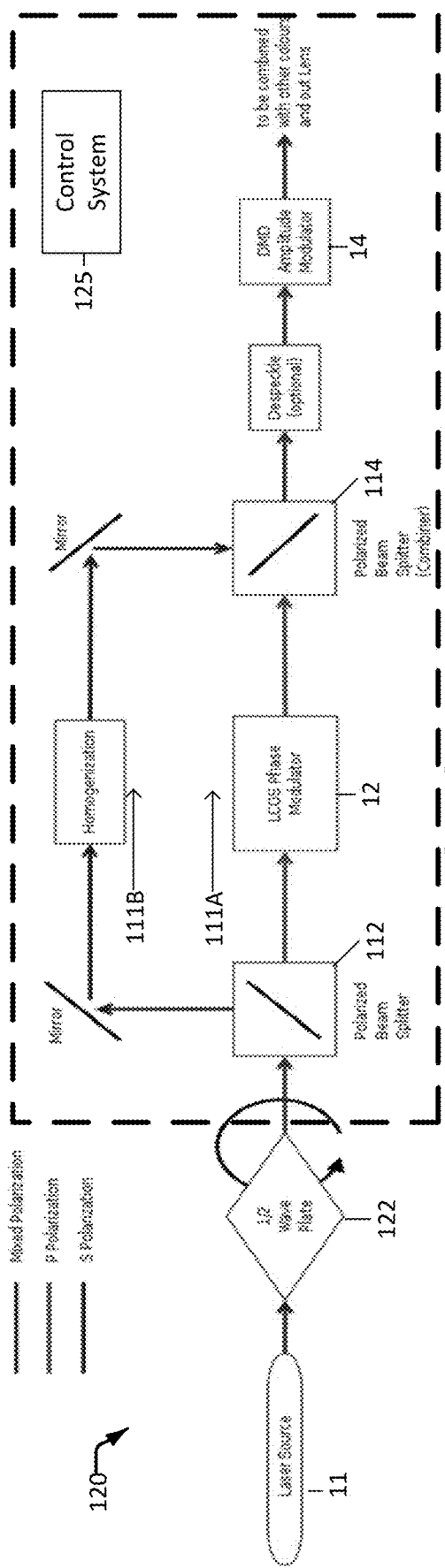
FIG. 11
FIG. 12

PROJECTION SYSTEMS AND METHODS

CROSS-REFERENCE TO RELATED APPLICATION

This application is a continuation of U.S. application Ser. No. 16/107,860 filed 21 Aug. 2018, which is a continuation of U.S. application Ser. No. 15/724,141 filed 3 Oct. 2017 now issued as U.S. Pat. No. 10,469,808, which is a continuation of U.S. application Ser. No. 15/287,390 filed 6 Oct. 2016 now issued as U.S. Pat. No. 9,848,176, which claims the benefit under 35 U.S.C. § 119 of US Application No. 62/237,989 filed 6 Oct. 2015 and entitled PROJECTION SYSTEMS AND METHODS, all of which are hereby incorporated herein by reference for all purposes.

TECHNICAL FIELD

One aspect of this invention relates to the generation of desired patterns of light in field sequential projection systems. Another aspect of this invention relates to the generation of desired patterns of light in a projection system with multiple stages of image forming elements. These aspects may be applied individually or in combination. Embodiments of the invention provide projectors, components for projectors, and related methods.

SUMMARY

This invention has a number of aspects. These may be practiced individually or in various combinations. These aspects include without limitation:
  Image projection apparatus;
  Image projection methods;
  Apparatus and methods for mixing light that has been steered onto an imaging element by a phase modulator with additional light.

An example aspect of the invention provides a method for projecting a color image. The method comprises for each of a sequence of fields, each of the fields associated with a corresponding color, setting an imaging element to spatially modulate light according to a pattern corresponding to the color and illuminating the imaging element with light of the corresponding color. Illuminating the imaging element with light of the corresponding color comprises directing light of the corresponding color onto a phase modulator that is controlled to provide a phase pattern operative to steer the light of the corresponding color to desired locations on the imaging element. The phase modulator is refreshed at a frequency that is less than a frequency with which the fields of the series of fields are presented. In some embodiments the phase modulator is refreshed once per frame (where a frame comprises one complete cycle of fields of different colors).

In some embodiments a separate phase modulator is provided for each of the plurality of colors and the method comprises refreshing the one of the phase modulators corresponding to one of the plurality of colors during a field corresponding to a different one of the plurality of colors.

In some embodiments a distinct area of the phase modulator is associated with each one of the plurality of colors and illuminating the imaging element with light of the corresponding color comprises directing light of the corresponding color to illuminate the area of the phase modulator associated with the corresponding color while the area of the phase modulator associated with the corresponding color is being controlled to provide the phase pattern operative to steer the light of the corresponding color to desired locations on the imaging element. In some embodiments the method comprises refreshing one of the areas of the phase modulator corresponding to one of the plurality of colors during a field corresponding to a different one of the plurality of colors.

The areas may have different sizes. For example, the plurality of colors may include blue and the one of the areas associated with blue may be larger than at least one other one of the areas; or the plurality of colors may include green and the one of the areas associated with green may be larger than at least one other one of the areas; or relative sizes of the areas may be controlled based on relative power levels for colors of the plurality of colors in an image being displayed. In some embodiments the method comprises periodically reassigning some or all of the plurality of colors to different ones of the plurality of areas of the phase modulator. For example, the sequence of fields may repeat once in each of a sequence of frames and the method may comprise reassigning some or all of the plurality of colors to different ones of the plurality of areas of the phase modulator in each of the frames.

In some embodiments 1 the same phase pattern is used for each of the plurality of colors.

In some embodiments the plurality of colors comprise red green and blue.

In some embodiments the imaging element comprises a DMD.

In some embodiments the phase modulator comprises an LCOS.

In some embodiments illuminating the imaging element with light of the corresponding color further comprises combining additional light of the corresponding color with the light that has been steered by the phase modulator or replacing the light that has been steered by the phase modulator with light that has bypassed the phase modulator. Combining the additional light with the light that has been steered by the phase modulator may produce a beam of light that illuminates the imaging element from a common direction. In some embodiments the additional light comprises light collected from a DC spot produced by the phase modulator. In some embodiments the additional light comprises light from an additional light source. In some embodiments the light that has been steered by the phase modulator has a first polarization, the additional light has a second polarization different from the first polarization and the light that has been steered by the phase modulator is combined with the additional light at a polarizing beam splitter. In some embodiments the light that has been steered by the phase modulator has a first wavelength, the additional light has a second wavelength different from the first wavelength and the light that has been steered by the phase modulator is combined with the additional light at a dichroic element. In some embodiments 13 the light source emits light having components of two polarization states and the method comprises separating the components of the emitted light wherein the additional light comprises one of the components of the emitted light and the light that has been steered by the phase modulator is made up of the other one of the components of the emitted light. In some such embodiments the method comprises altering the relative intensities of the components of the two polarization states by passing the emitted light through a polarization shifting element and controlling the polarization shifting element to vary a proportion of the light in each of the separated components based on a brightness of an image being projected.

Another example aspect provides a method for projecting a color image that comprises illuminating an imaging element with light of a color by selectively, based on a brightness or power level of the image: operating in a first mode wherein light of the color is directed onto a phase modulator that is controlled to provide a phase pattern operative to steer the light of the color to desired locations on the imaging element and: operating in a second mode wherein either: light of the color is either directed onto the imaging element from a light source without interacting with the phase modulator; or light of the color is directed onto a phase modulator that is controlled to provide a phase pattern operative to steer the light of the color to desired locations on the imaging element and combined with additional light of the color and the combined light is directed onto the imaging element.

Another example aspect provides apparatus for projecting images that is configured to implement any of the methods described herein.

Additional aspects of the invention and example embodiments of the invention are illustrated in the drawings and/or described in the following description.

BRIEF DESCRIPTION OF THE DRAWINGS

The accompanying drawings illustrate non-limiting example embodiments of the invention. These drawings illustrate example projectors and also illustrate example methods.

FIG. 1 is a schematic illustration showing the red light path through a projector operating according to a first approach where only the red channel phase Liquid Crystal on Silicon ("LCOS") is illuminated and the DMD only directs the red pixels to the screen.

FIG. 2 is a schematic illustration showing the green light path through a projector operating according to the first approach where only the green channel phase LCOS is illuminated and the DMD only directs the green pixels to the screen.

FIG. 3 is a schematic illustration showing the blue light path through a projector operating according to the first approach where only the blue channel phase LCOS is illuminated and the DMD only directs the blue pixels to the screen.

FIG. 4 is a schematic illustration showing the red light path through a projector operating according to a second approach where only the red spatial portion of the phase LCOS is illuminated and the DMD only directs the red pixels to the screen. The single LCOS also displays the green and blue phase patterns in different locations but these are not illuminated in FIG. 4.

FIG. 5 is a schematic illustration showing the green light path through a projector operating according to the second approach where only the green spatial portion of the phase LCOS is illuminated and the DMD only directs the green pixels to the screen. The single LCOS also displays the red and blue phase patterns in different locations but these are not illuminated in FIG. 5.

FIG. 6 is a schematic illustration showing the blue light path through a projector operating according to the second approach where only the blue spatial portion of the phase LCOS is illuminated and the DMD only directs the blue pixels to the screen. The single LCOS also displays the red and green phase patterns in different locations but they are not illuminated in FIG. 6.

FIG. 7 is a schematic illustration showing the red light path through a projector operating according to a third approach where a luminance phase pattern on the LCOS is illuminated and the DMD only directs the red pixels to the screen and attempts to block unwanted red light in other places. The luminance phase pattern is created from a weighted sum of the red, green, and blue phase patterns (or other method).

FIG. 8 is a schematic illustration showing the green light path through a projector operating according to the third method where a luminance phase pattern on the LCOS is illuminated and the DMD only directs the green pixels to the screen and attempts to block unwanted green light in other places. The luminance phase pattern is created from a weighted sum of the red, green, and blue phase patterns (or other method).

FIG. 9 is a schematic illustration showing the blue light path through a projector operating according to the third method where a luminance phase pattern on the LCOS is illuminated and the DMD only directs the blue pixels to the screen and attempts to block unwanted blue light in other places. The luminance phase pattern is created from a weighted sum of the red, green, and blue phase patterns (or other method).

FIGS. 10 to 13 relate to methods and apparatus which display images using a plurality of light paths.

FIG. 10 illustrates a "fixed polarization" method of implementation with two separate laser light sources.

FIG. 11 is a schematic illustration showing a "random polarization" method of implementation and would be ideal with a fiber coupled laser source.

FIG. 12 is a schematic illustration showing a "variable polarization" method of implementation. This is the most complicated and expensive, but allows for the most efficient use of lasers.

FIG. 13 illustrates a the "fixed wavelength" method of implementation with two separate laser light sources.

DESCRIPTION

Figure 1:
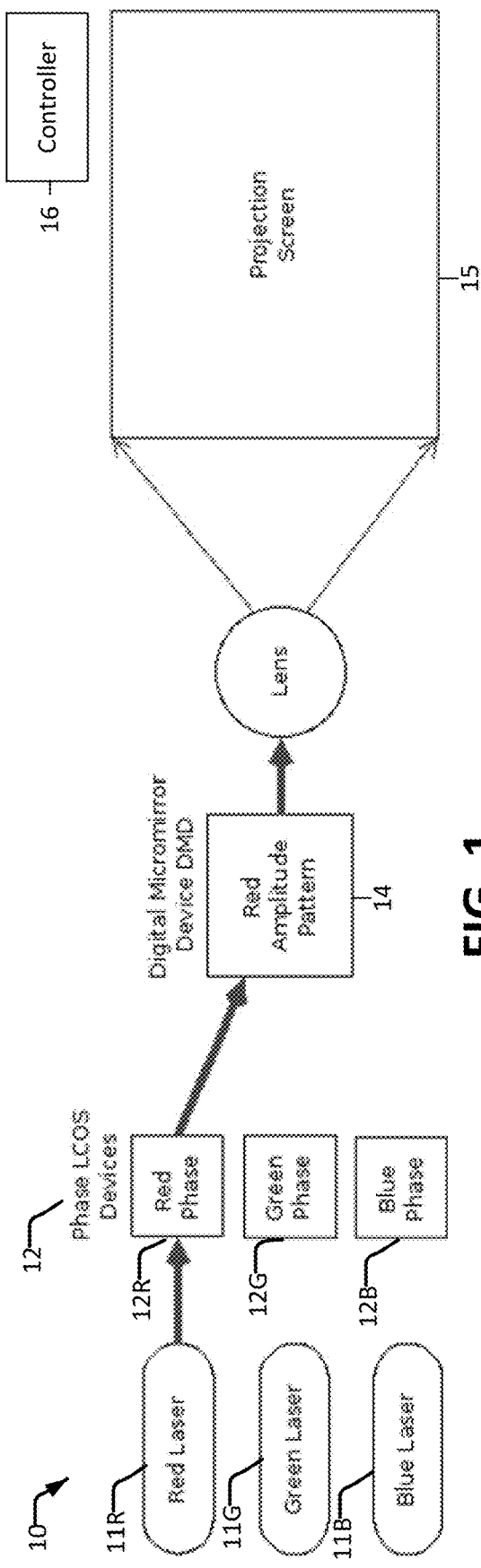
FIGS. 1 through 9 relate to methods and apparatus which display images in a field sequential manner. Field sequential projectors employing secondary colours or white as fields can also be represented using these diagrams by turning on more than one light source at a time and adjusting the amplitude image on the Digital Micromirror Device ("DMD").

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

This disclosure explains both a number of ways to perform field-sequential color-projection and also explains a number of ways to illuminate a DMD or other imaging element. These aspects of the present technology bay be applied individually or in any combinations.

Field-Sequential Displays

Images can be formed in a projection system by using separate image forming elements for each of red, green, and blue lights and then combining these images on a screen. However, projector manufacturers typically desire to make projectors as inexpensively as possible. Image forming elements such as high quality, high resolution DMDs can be expensive.

High dynamic range projection systems may have multiple stages of imaging elements. These elements may cooperate to increase system contrast and/or reduce black level.

In some high dynamic range ("HDR") projection systems a phase modulator (e.g. an LCOS phase modulator) may be combined with a DMD amplitude modulator. Examples of this type of projection system are described, for example, in WO 2015/054797, which is hereby incorporated herein by reference for all purposes. Embodiments described herein may implement any of the features described in WO 2015/054797.

To reduce the component cost, a HDR projector may use a field sequential technique such that only one DMD is required. As described herein, in some embodiments, one phase modulator may be used instead of three. DMDs typically have a fast response time. Specifically, DMDs can change the pattern they display far faster than a human can perceive it. Instead of having a separate DMD for each colour (and thereby using three DMDs), one can provide a single DMD and rapidly time division multiplex fields through the single DMD. Although the colours are displayed one-at-a time, all colours in the image are integrated by the human eye because the time division multiplexing occurs faster than humans can perceive the individual fields. This is known in the industry as "field sequential projection".

Many phase modulators have relatively slow response times. For example, phase modulators may be LCOS based. A human observer could easily perceive individual colour fields in a field sequential application where a single LCOS is reconfigured for the next colour between fields.

Individual LCOS panels typically cannot handle as much light as a single DMD without damage or degradation. In systems with very high light output two or more LCOS panels may be required to illuminate a single DMD. Blue light may cause more degradation of an LCOS panel than light of longer wavelengths (e.g. red light).

Example Field-Sequential Embodiments

Three example methods for performing field sequential projection in a projector that uses an LCOS phase modulator and a DMD amplitude modulator are described below. Each of these methods may be practised using a single DMD. The descriptions below assume a field sequential projector using red, green, and blue as three sequential fields. Variations of the methods described below may use different colours, more or fewer primary colours, one or more secondary colours (e.g. combinations of primary colours), and/or white as fields.

First Approach—Three Phase Modulators and One Imaging Element

A "First Approach" uses three LCOS phase modulators: one for red, one for green, and one for blue light redirection. The first approach can provide high light throughput and can offer high contrast and wide colour gamut.

Figure 2:
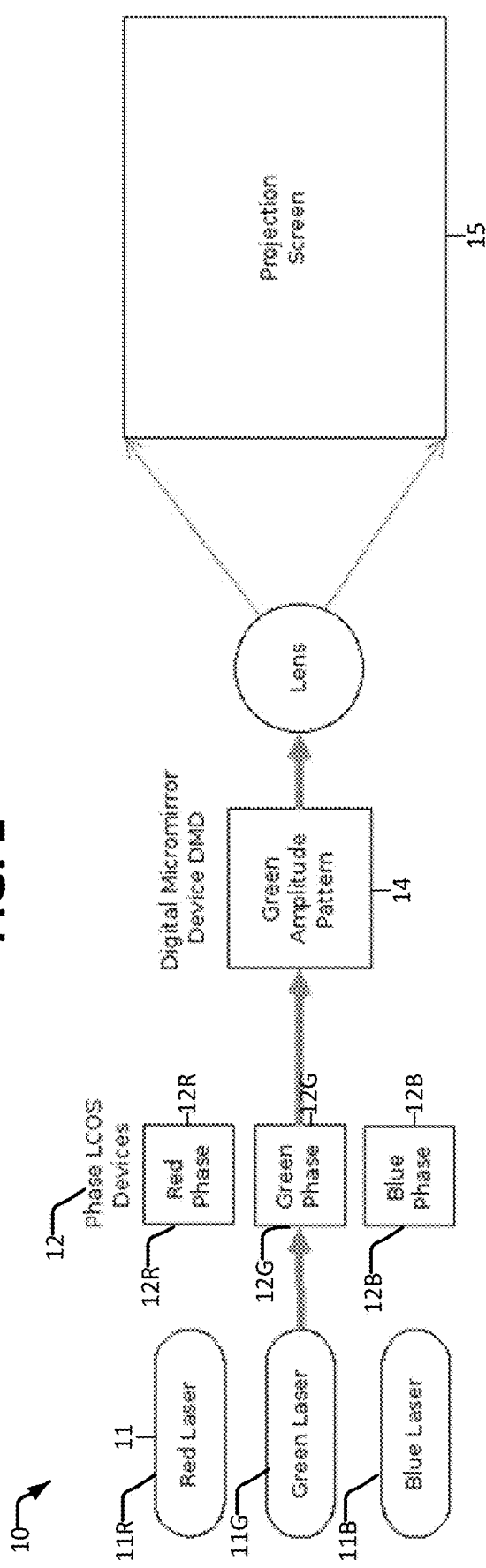
Figure 3:
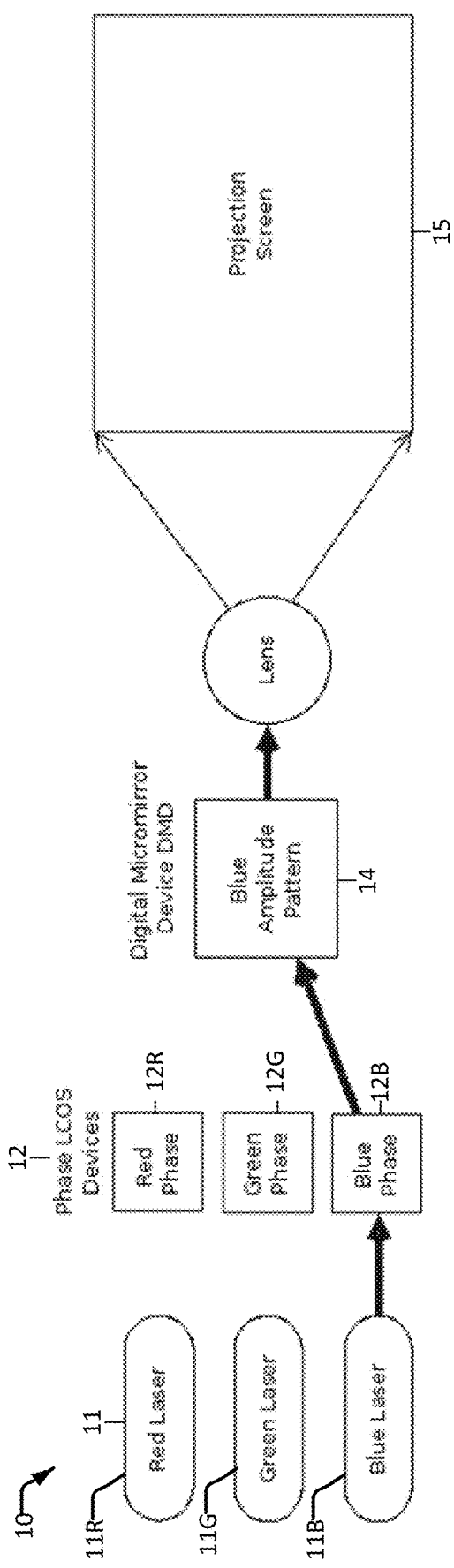

Apparatus 10 that can operate according to the first approach is illustrated schematically in FIGS. 1 to 3. Apparatus 10 comprises a plurality of light sources 11 (11R, 11G and 11B are shown). Light sources 11 may, for example, comprise lasers. In the illustrated embodiment, light source 11R emits red light; light source 11G emits green light; and light source 11B emits blue light.

Each of light sources 11 is associated with a corresponding phase modulator 12 (12R, 12G and 12B are shown). The phase modulators may each comprise an LCOS for example. Light modulated by any of phase modulators 12 illuminates an imaging element 14. Imaging element 14 may, for example, comprise a DMD. Imaging element 14 modulates the light which is then projected onto a screen 15.

A controller 16 coordinates the operation of light sources 11, phase modulators 12 and imaging element 14 to display an image according to image data. One light source is active in each of a plurality of sequential fields (each field is a period of time). In an example embodiment a frame rate is in the range of 20 to 100 frames per second and each frame is divided into three fields.

In a first field as shown in FIG. 1, red light source 11R may be active. Red light from red light source 11R is steered to desired locations (e.g. locations corresponding to areas where the image data specifies higher intensity of red) and/or steered away from undesired locations (e.g. locations corresponding to areas where the image data specifies low intensity of red) by a phase pattern applied to phase modulator 12R. The red light modulated by phase modulator 12R is then directed onto imaging element 14 which is controlled to modulate the incident light in a pattern specified by the image data for red light.

In second and third fields the process described above is repeated for green and blue light respectively as illustrated in FIGS. 2 and 3.

In this example embodiment phase modulators 12 do not need to be refreshed any faster than the frame rate (which in this example is ⅓ of the rate at which fields are presented). Imaging element 14 is refreshed for every field.

For each field, controller 16 may perform steps that include:
  set the imaging element to a pattern corresponding to the corresponding color;
  refresh a phase modulator corresponding to a different color (the phase modulator corresponding to the current color may have been refreshed in a previous field),
  turn on the light source of the current color such that light from the light source is steered by the phase modulator, modulated by the imaging element and projected onto screen 15.

The duration of each field is short enough that the different colors displayed in each field are integrated by the eyes of viewers to provide the sensation of a color image.

In example embodiments, three phase modulators (one per color) are illuminated in sequence by modulated light sources (typically laser sources). Each phase modulator is controlled to provide a phase pattern customized for the incident beam wavelength and profile such that a steered image is generated at a steered image plane at a known distance away from the phase modulator. The steered images may carry higher intensity where image data specifies higher luminance for the color and lower intensity where image data specifies lower luminance for the color. Optical elements are provided to relay the steered images of all three color channels along a common path to the imaging element (e.g. to a head comprising a DMD). Each steered image provides desired steered illumination of a DMD or other imaging element. The optical elements that relay the steered images to the imaging element may optionally provide one or more of magnification, telecentricity improvement and increasing etendue that may lead to image quality improvements and better compatibility with the DMD head.

The optics that guide each of the steered images to the imaging element may be located in the light path either after the three separate steered image beams have been made telecentric or before the steered image plane. This is facilitated because the steered images are monochromatic (laser primaries) and have a high F/number (low divergence).

The phase modulators may be set to display custom patterns per color channel such that each steered image features a desired luminance profile for that color channel as well as framing (image size and shape) consistent with the steered images of the other color channels To achieve consistent framing, the distances between each phase modulator and its corresponding steered image plane can be selected based on criteria such as wavelength, beam divergence and beam profile.

In embodiments that operate according to the first approach the duration that each light source is activated (ON time for the R, G, B light sources) may be varied based on a desired steered luminance level and color. For example, one can activate R, G, B sources for durations that yield a steered full screen white with D65 white point. In cases where the intensity of light output by each light source can be modulated the desired luminance and color of a displayed image may be set by controlling one or more of: the ON time for each light source in the corresponding field, power output of each light source, duty cycle of each light source. Some benefits of modulated light sources include being able to use lower power lasers and drive them at the required higher power with a shorter duty cycle (e.g. 30% red @2× typical max power).

Second Approach—One Spatially-Divided Phase Modulator and One Imaging Element

Figure 4:
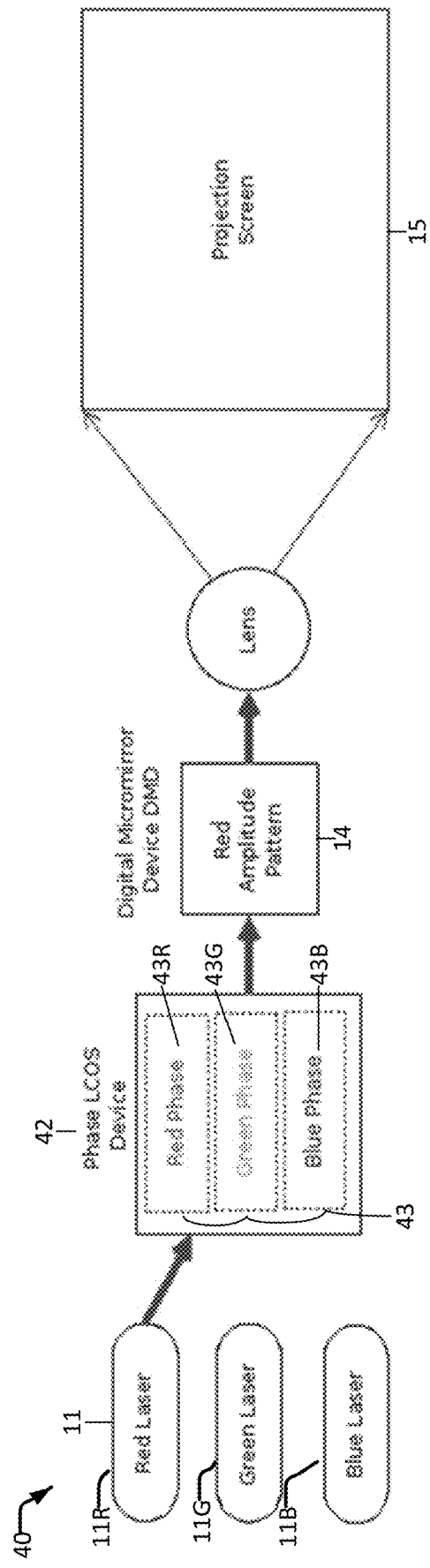
Figure 5:
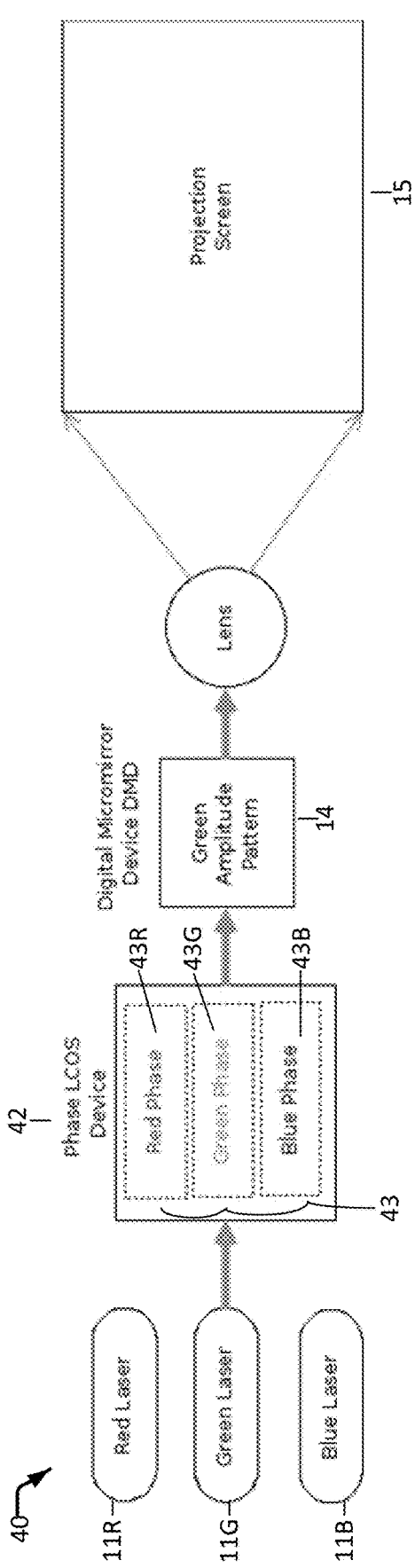
Figure 6:
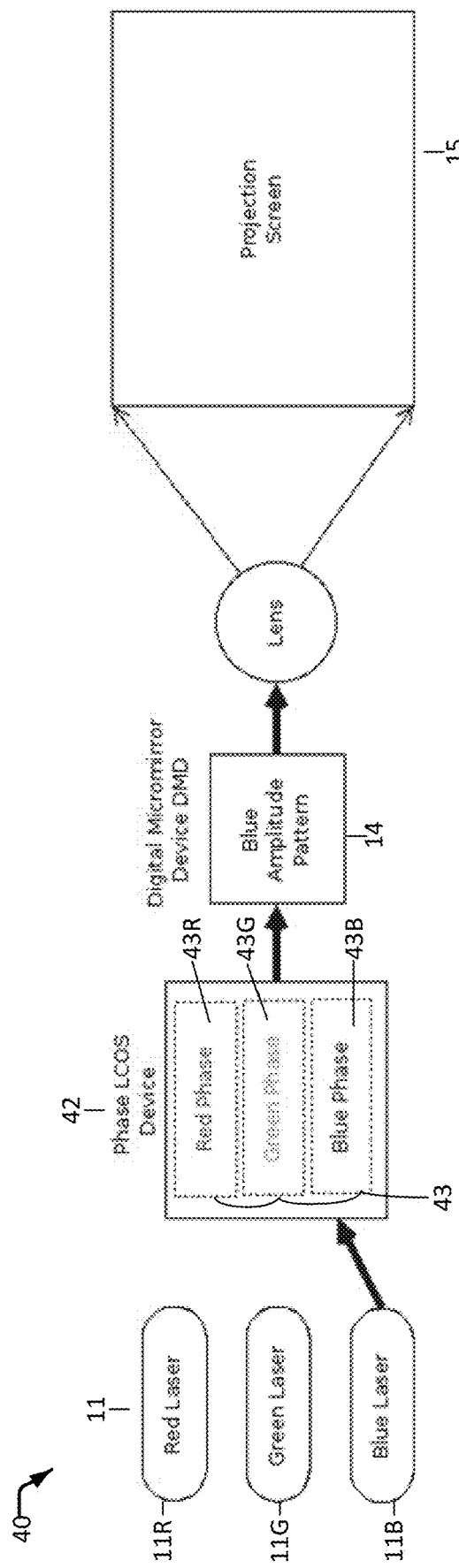

A "Second Approach" employs a single phase modulator spatially divided into plural areas. The phase modulator is controlled so that each area provides a phase pattern for one color (i.e. a phase pattern that steers light appropriately for the corresponding color). A projector 40 according to an example embodiment is illustrated in FIGS. 4, 5 and 6.

In the example embodiment light sources 11 (again 11R, 11G and 11B are provided, for example) respectively emit red, green and blue light. The red green and blue light are respectively directed to illuminate corresponding areas 43R, 43G and 43B of phase modulator 42 (which may be an LCOS for example). Areas 43R, 43G and 43B are respectively controlled to provide phase patterns for the red, green, and blue light. These phase patterns direct the light onto an imaging element 14. Imaging element 14 is set in each field to modulate the light of the current color. The light modulated by the imaging element 14 is projected onto screen 15.

The second approach may offer cost saving in comparison to the first approach because only a single phase modulator is required. The second approach may compromise contrast because light of the individual colours may not be steered as accurately when only a portion of a phase modulator is used to steer the light as could be the case where an entire phase modulator is used to steer the light. The second approach also allows for usage of the full gamut allowed by the primary colors, which may be laser primaries.

In some embodiments the physical locations on the LCOS of the areas 43 corresponding to different colours can be changed from time to time for wear-leveling. The blue area 43B may age faster than the red area 43R over time.

The division of phase modulator 42 into areas 43 need not be equal. The sizes of some or all of areas 43 may be different. For example:
- the sizes of areas 43 may be proportional to power requirements for the different colors. Areas 43 may optionally be re-sized in real time as power requirements for light of different colors change.
- area 43G may be made larger than other areas 43 due to the human visual system's increased sensitivity to the accuracy of green light; or
- area 43B for blue may be increased to provide lower power density and reduced aging.

In the second approach, each area 43 of phase modulator 42 needs to be refreshed at most once per frame. All areas 43 of phase modulator 42 may be refreshed in one operation. In cases were the different areas 43 of phase modulator 42 can be individually refreshed one area 43 may be refreshed while light is being steered by another area 43.

When a single phase modulator is spatially divided, a geographic portion of the LCOS is used for each individual colour. Each portion is driven with a corresponding phase image. All three phase images are computed, scaled, and combined into a single phase image that is applied to the LCOS phase modulator.

Each light source 11 (e.g. each laser) is directed to illuminate exclusively the corresponding colour region on the LCOS modulator 42. No part of the LCOS should be illuminated by more than one laser colour.

For wear leveling, lasers may be from time to time redirected to different regions of the LCOS to change where blue is. Blue light ages LCOS devices faster than red or green light.

In example embodiments that implement the second approach a single phase modulator is illuminated in sequence by each of a plurality of modulated light sources but each light source only illuminates a corresponding portion of that single phase modulator. The size of the portion of phase modulator allocated for each color may be determined by desired steered image quality (in general, everything else being equal the more pixels allocated for a color the better the quality of the steered image will be for that color). Each color-specific portion of the phase device may be controlled to provide a phase pattern customized for the wavelength of light of the color, incident beam profile/quality, etc such that the steered image formed by that portion will overlap with the steered images of the other channels (i.e. framing should be consistent).

In some embodiments to form RGB steered images at a steered image plane a common distance from the phase modulator the phase patterns of each color portion may be computed using target images with different geometries (i.e. the target images for different colors may be scaled differently to compensate for wavelength effects on steering). As in some embodiments which apply the first approach optical elements that relay the steered images to the imaging element may optionally provide one or more of magnification, telecentricity improvement and increasing etendue that may lead to image quality improvements and better compatibility with the DMD head.

Color combination optics are optionally present but are typically not necessary following the phase modulator since the steered images for each color may be provided at a common steered image plane in a field-sequential manner. Color combination optics may be provided to aggregate the incident light from the 3 portions of the phase modulator such that the paths taken by the R, G, B beams as they are incident on the imaging element are closely spaced and parallel or nearly parallel. If the incident beams are not perfectly-parallel the corresponding color-specific phase patterns may provide tilt correction.

Third Approach—One Common Phase Modulator and One Imaging Element

A "Third Approach" employs a single LCOS phase modulator displaying a single phase pattern for each frame. This is the most cost effective method due to the fact that it uses a single phase modulator and only one phase pattern needs to be computed (instead of 3) such that less expensive computational hardware may be used. The third approach may compromise colour gamut because it can allow more leakage of unwanted colours through the system (due to not steering unwanted colour components). The third approach can provide contrast almost on par with the first approach.

Figure 7:
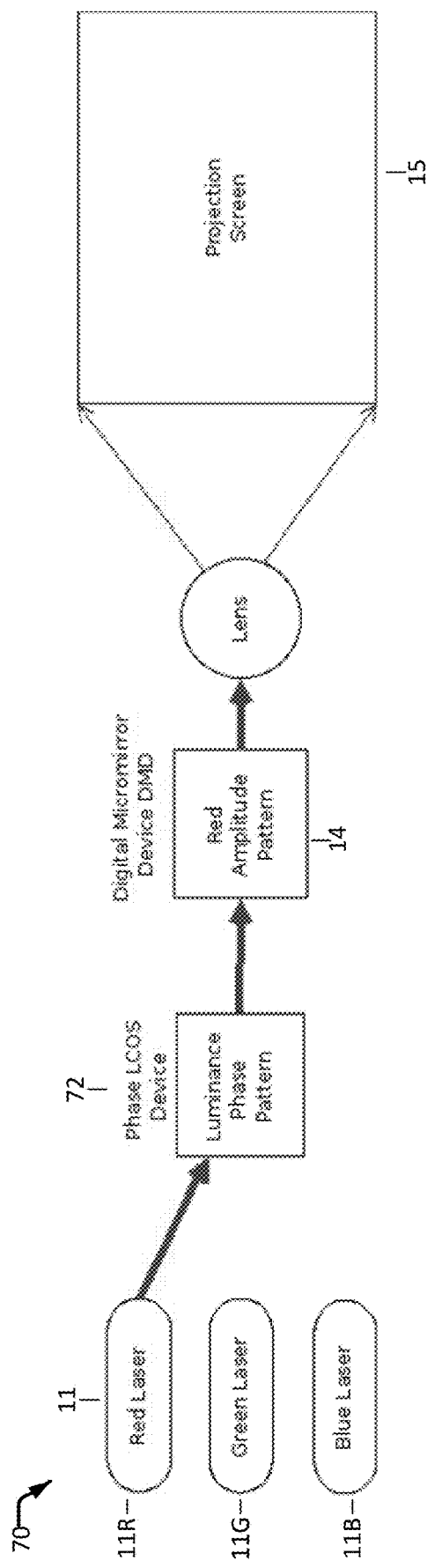
Figure 8:
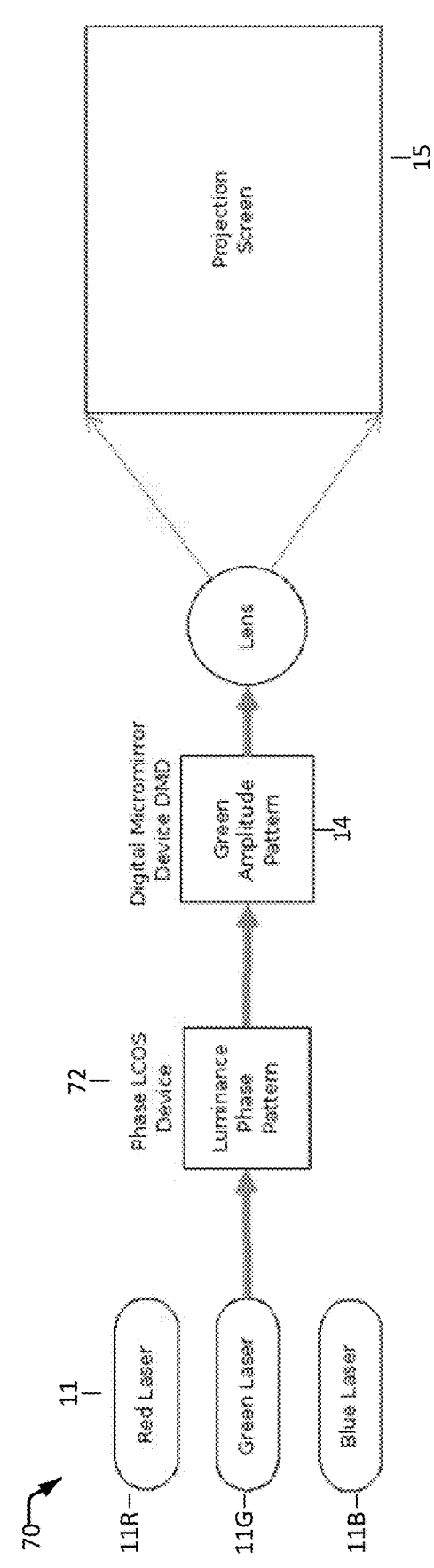
Figure 9:
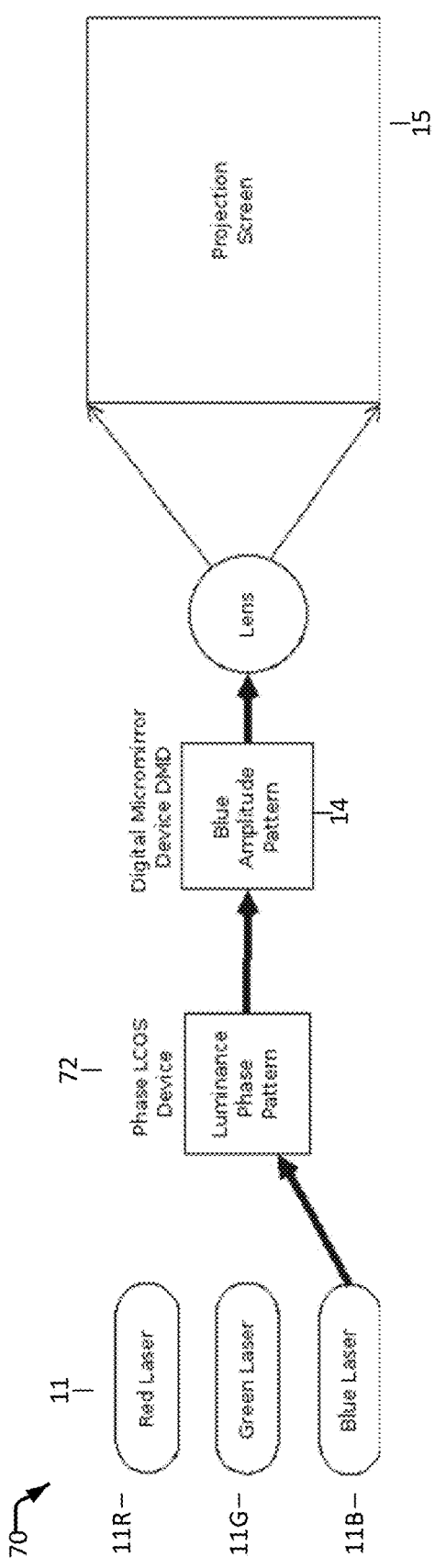

FIGS. 7, 8, and 9 schematically illustrate apparatus 70 configured for operation according to the third approach. Apparatus 70 includes light sources 11 (again 11R, 11G and 11B are provided, for example) that respectively emit red, green, and blue light. The red, green, and blue light is respectively directed to illuminate phase modulator 72 (which may comprise an LCOS for example). Phase modulator 72 is set with a phase pattern that is selected to steer light from any one of light sources 11 onto an imaging element 14. The same phase pattern may be used for two or more different colors of light.

Imaging element 14 is set in each field to modulate the light of the current color. The light modulated by the imaging element 14 is projected onto screen 15.

Phase modulator 72 may be updated with a new pattern once per frame or more seldom than that if the intensity distribution for successive frames is the same or similar.

Luminance Phase Modulation Images

If a single phase image is used to direct light for all colours (as for example when applying the third approach discussed above), it should direct sufficient light to the DMD in any area where any colour is present to illuminate all the image features.

The DMD is controlled to block any unwanted colours from the screen for each image feature. The ability of the DMD to block light determines the size of the final gamut (because a pure red object will have a small amount of green and blue light leaked on it).

One way to create a luminance image from an RGB image (i.e. image data that specifies R, G and B values for individual pixels) is to convert an RGB image to the XYZ colour space and to use the Y channel as the luminance image.

In certain embodiments that implement the third approach, a single phase modulator is illuminated in sequence by modulated light sources of different colors. Each light source may illuminate substantially all of an active area of the phase modulator. A common phase pattern is used to steer light for all three color channels such that the steered images have the desired luminance profile and the combination of the steered images provides the same color point.

Since the phase pattern is common for all colors one may direct beams from the different-colored light sources to be incident on the phase modulator at different angles such that three steered images are produced at different distances and along different orientations relative to the phase modulator. Separate color combination and relay optics may then be used to recombine, shape and relay the separate steered images onto the imaging element. This construction can be used to match the framing of the different colors.

Another way to match the framing of different color channels is to make beams of different colored light incident on the phase modulator in a parallel fashion but to modify the collimation of some or all of the beams so some or all of the beams are slightly diverging or converging. The amount of divergence or convergence of each beam may be selected to compensate for the different distances at which steered images would otherwise be formed for the different colors. The steered images can then be relayed onto the imaging element. As in the other approaches, projectors that apply the third approach may optionally include optical elements that magnify, improve telecentricity and/or increase etendue.

Approaches for Illuminating an Imaging Element

Another aspect of this invention provides methods and apparatus to more directly illuminate a DMD and/or to selectively illuminate a DMD or other amplitude modulator with light that is somehow pre-modulated and/or with light that is more directly delivered from a light source to the amplitude modulator. Such methods and apparatus may direct a portion of light from a source to a DMD bypassing a phase modulator or other up-stream light-attenuating component and/or may add one or more second light sources directed to illuminate the DMD only. Direct illumination of the DMD may help to boost efficiency when displaying bright scenes.

Methods and apparatus of this aspect may be applied individually or may be combined with methods and apparatus according to any of the first approach to the third approach, which are discussed above. Such methods and apparatus may also be applied in colour projection systems which include three complete sets of LCOS and DMD.

In high dynamic range projection systems an LCOS phase modulator may be combined with an amplitude modulator (e.g. a DMD) such that the LCOS phase modulator steers to locations on the amplitude modulator where it is needed.

In the case of full screen white or very bright images, it is more efficient to illuminate a DMD directly as opposed to using the phase modulator to steer light onto the DMD. LCOS panels typically cannot handle as much light energy as a DMD so total system light throughput capacity may be increased by allowing at least some light to bypass the LCOS modulator at least when a bright image is being projected.

Some embodiments combine light being steered by a phase modulator with light bypassing the phase modulator such that the combined light arrives at the DMD at a uniform angle of incidence. This addresses the problem that DMDs are often very sensitive to the angle that light approaches. Light that bypasses the LCOS and light that was steered by the LCOS may be combined such that it all is incident on the DMD at the same angle (i.e. within a small range of angles of incidence that the DMD can accommodate). In some embodiments, this is achieved using a combiner that combines light incident on the combiner from two different directions into a combined beam of light that leaves the combiner in a common direction. The combiner may comprise, for example, a polarizing beam splitter or dichroic element.

FIGS. 10 through 13 illustrate example apparatus which can be operated to illuminate an imaging element such as a DMD with:

light that has been steered by a phase modulator (and/or processed by some other upstream light attenuating optical element);

light that has been directed to illuminate the imaging element without being steered by the phase modulator; or blends of the above.

The light that has been steered by the phase modulator and the light that has not been steered by the phase modulator may come from the same or different light sources.

Light may be selectively caused to propagate on different paths using polarization. For example, light can be P polarized, S polarized, or both (random polarization). S and P polarized lights are polarized at right angles to each other. Light of S and P polarizations can be separated from one another with a polarizing beam splitter. P and S polarized light can be combined to random, and random can be split into P and S using a polarized beam splitter.

Laser light sources with random polarization have large components of both S and P polarizations. Free space lasers tend only to produce S or P polarized light depending on the physical orientation of the laser. Physically rotating the laser can change whether the emitted light is S or P polarized.

LCOS phase modulators tend to function well only with a single type of polarization (depending on orientation). For instance if a LCOS panel is oriented for P-polarized light, it will tend to reflect S-polarized light directly back toward the source instead of allowing the S-polarized light to pass.

Using a LCOS modulator to steer light from a P polarized source allows for combination of steered P-polarized light with non-steered S polarized light before directing the resulting combined random polarized light to the DMD amplitude modulator.

Fixed Polarization Approach

In some embodiments, two separate light sources, e.g. banks of lasers, can be used; one to produce S polarized light and one to produce P polarized light (the "fixed polarization" approach). Light from one of the light sources (e.g. the P-polarized light) is directed to illuminate an imaging element (e.g. a DMD) by way of a steering element (e.g. an LCOS). Light from other light source(s) (e.g. the S-polarized sources) is directed to illuminate the imaging element without interacting with (i.e. bypassing) the steering element. If the bypass light (e.g. the S-polarized light) is not desired at the imaging element, for example because the scene displayed is very dark, the source of bypass light (e.g. the S-polarized light source) can be turned down or off and/or directed away from and/or blocked from reaching the imaging element.

Figure 10:
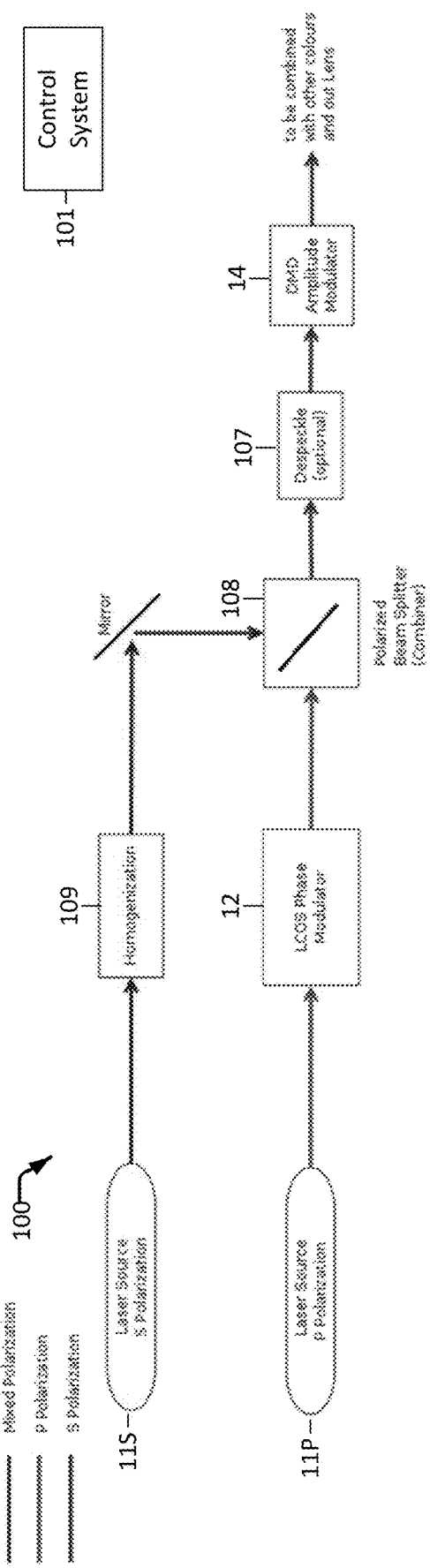

FIG. 10 illustrates a projector 100 which implements a "fixed polarization" approach with two separate laser light sources 11S and 11P. Light source 11P illuminates a phase modulator 12 with P-polarized light. Phase modulator 12 is set with a phase pattern that steers the P-polarized light onto an imaging element 14 such as a DMD by way of a combiner 108 which, in this embodiment, comprises a polarizing beam splitter.

Light source 11S emits S-polarized light that is homogenized by passing through an optical system 109 and directed onto combiner 108. Optical system 109 makes the light that passes through it be uniformly distributed (or distributed in another desired way at the imaging element). Optical system 109 may, for example, comprise a fly-eye array and/or other homogenizer.

Any light from light source 11S is combined at combiner 108 with light from light source 11P and directed to illuminate imaging element 14.

A despeckling element 107 is optionally provided in the light path upstream from imaging element 14. The despeckling element despeckles the combined beam. The optional despeckling element may be provided immediately before the DMD amplitude modulator, for example.

DMDs and other amplitude modulators are not perfect at blocking light, so in scenes with a lot of dark it is desirable to stop light that does not originate from the phase modulator from hitting the DMD.

A control system 101 may be connected to control light sources 11P and 11S. In some embodiments light sources 11P and 11S have outputs that are individually controllable. In some embodiments control system 101 may control the output of light from light source 11S. In some embodiments control system 101 may switch light source 11S on or off depending upon whether additional light is required. Control system 101 may also control the application of data to phase modulator 12 and imaging element 14 and the overall timing of operation of apparatus 100.

Random Polarization (or Unpolarized) Approach

A single source of light may be used (likely fiber-coupled LEDs) that emits both S and P polarization (the "random polarization" approach). In this case, a polarizing beam splitter can be employed to separate the S and P components of the incoming light into two separate paths. An attenuator such as an aperture, and/or a shutter and/or a controllable redirection element such as a movable mirror or lens may be provided in the S (bypass) light path to attenuate the light bypassing the phase modulator in cases where dark blacks are required. The P component may be modulated (e.g. steered by a phase modulator) before it is incident on the amplitude modulator.

FIG. 11 is a schematic illustration of an example apparatus 110 configured to operate according to the random polarization approach. Apparatus 110 comprises a light source 11SP that emits light that includes plural separable polarization components (e.g. S- and P-polarized components). Light source 11SP may beneficially but optionally comprise a fiber coupled laser source.

It is preferable that light emitted by light source 11SP has good beam quality (i.e. low etendue) which allows it to be collimated with a small divergence. This then allows for better separation (e.g. better uniformity and higher throughput) of the S and P-polarized components at beam splitter 112 into paths 111A and 111B.

Homogenizer 115 is preferably chosen such that the etendue of the light along path 111B does not increase significantly. This facilitates combining the beams of light at combiner 114. One suitable choice for homogenizer 115 is a lens combination that includes a fly's eye lens array where such a combination can provide homogenization with minimal increase in etendue.

Embodiments as illustrated in any of FIGS. 10 to 13 can benefit from using low etendue light. The low etendue facilitates efficiency, uniformity etc. when different beams of light are combined.

Light emitted by light source 11SP is divided based on polarization into two paths 111A and 111B by a beam splitter 112. Path 111A carries light to illuminate an imaging element 14 by way of a phase modulator 12. Path 111B bypasses phase modulator 12. Paths 111A and 111B merge at a combiner 114 upstream from imaging element 14.

Path 111B includes a homogenizer 115 and an aperture 116. Aperture 116 may be controlled to adjust the amount of light incident on imaging element 14 that is delivered by bypass path 111B.

A control system 115 may control aperture 116 to selectively regulate the amount of light from path 111B that is allowed to reach imaging element 14. Control system 115 may also control the application of data to phase modulator 12 and imaging element 14 and the overall timing of operation of apparatus 110.

Variable Polarization Approach

A "variable polarization" approach is similar to the random polarization approach but provides a way to vary the relative intensities of the separable polarization components of the light emitted by the light source. For example, apparatus that implements the variable polarization approach may comprise a half wave plate that can be quickly rotated within 90 degrees. By setting rotation of the half wave plate on a frame-by-frame basis, one can adjust the mixture of S and P polarizations sent to the polarization beam splitter. The resulting beam may be used as the input to the "random polarization" apparatus described above and allow for more light to be sent directly to the DMD (e.g. more S-polarized light) for bright scenes and more to the LCOS (e.g. more P-polarized light) for dark scenes.

FIG. 12 is a schematic illustration showing apparatus 120 that implements the "variable polarization" approach. The FIG. 12 embodiment is typically more complicated and expensive to make than the embodiments of FIGS. 10 and 11 but allows for the most efficient use of lasers.

The portion of apparatus 120 shown inside box 121 is common to apparatus 110 which is described above. Apparatus 120 comprises a light source 11 that emits polarized light. The polarization of the light can be altered by a polarization shifting element 122. The polarization shifting element may be controlled to alter the relative amounts of two polarization states in the light that are separable by beam splitter 112. For example, polarization shifting element 122 may comprise a half-wave plate and a motor or other actuator connected to set an angle of rotation of the half-wave plate.

A control system 125 may control polarization shifting element 122 to selectively regulate the amount of light that enters path 111B. Control system 125 may also control the application of data to phase modulator 12 and imaging element 14 and the overall timing of operation of apparatus 120.

Wavelength-Based Separation Approaches

Other approaches to control paths taken by light separate light based on wavelength. Different wavelengths of light can be separated with a dichroic element or multilayer thin film, for example. Thus a system can be created that has 2 sets of reds, greens, and blues. The reds, greens, and blues may be selected such that a large gamut can be created with either set and the absence of one is not noticeable.

In a similar manner to the above, two light sources, e.g. two lasers, with similar wavelengths can be used where one wavelength is sent to the LCOS or other phase modulator and the other wavelength is provided directly (e.g. without significant attenuation) to the DMD or other amplitude modulator using a colour beam splitter (the "fixed wavelength" approach). The two wavelengths may correspond to the same primary colour (e.g. the two wavelengths may be different reds, greens, or blues).

Figure 13:
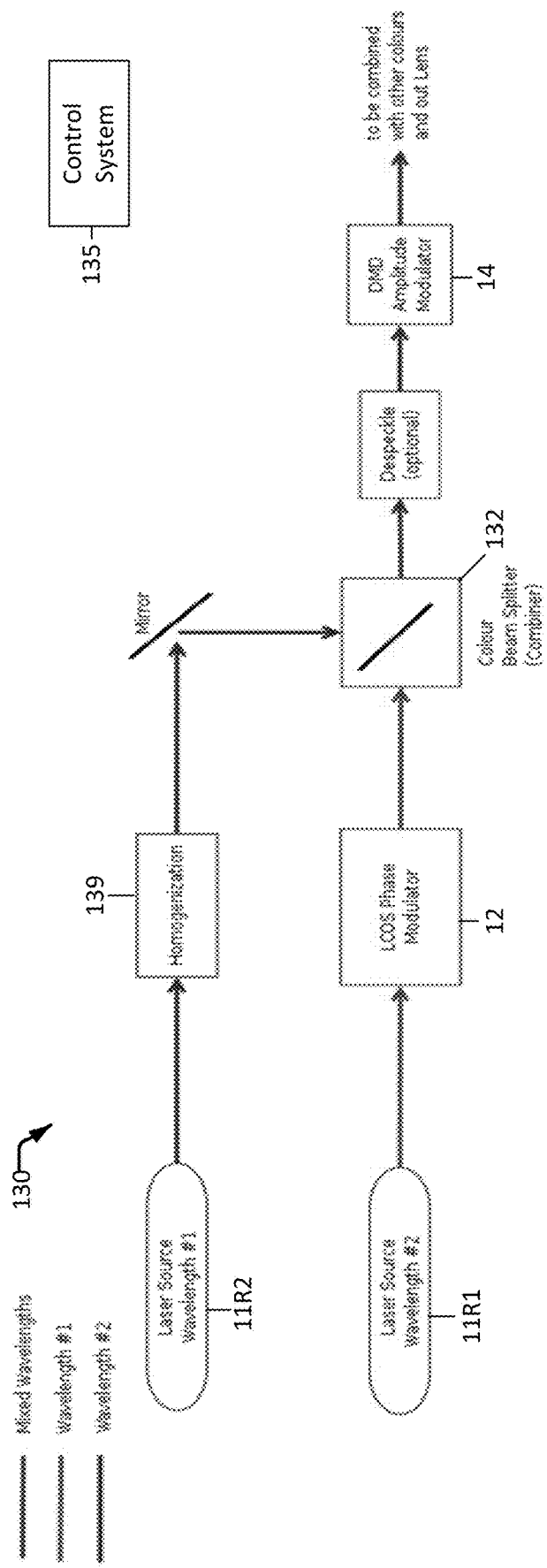

FIG. 13 illustrates schematically apparatus 130 that implements a "fixed wavelength" approach with two separate laser light sources 11R1 and 11R2 that emit light of different wavelengths. The wavelengths may be closely spaced, for example, separated by differences of 5 nm or 10 nm. In other embodiments the two wavelengths may be more widely separated. The wavelengths could be two shades of the same color, for example two shades/tones of red, green or blue.

Light source 11R1 illuminates an imaging element 14 by way of a phase modulator 12. Light source 11R2 illuminates imaging element 14 by way of a light path that bypasses phase modulator 12. Light from light sources 11R1 and 11R2 are combined at a combiner 132. Optics 139 homogenize light in light path 11R2.

A control system 135 may be connected to control light sources 11R1 and 11R2. In some embodiments light sources 11R1 and 11R2 have outputs that are individually controllable. In some embodiments control system 135 may control the output of light from light source 11R2. In some embodiments control system 135 may switch light source 11R2 on or off depending upon whether additional light is required. Control system 135 may also control the application of data to phase modulator 12 and imaging element 14 and the overall timing of operation of apparatus 130.

DC Spot Recycling

Phase modulators can produce a DC spot that does not correspond to an image feature. It is normally desirable to steer the DC spot out of the image. The light from this spot may be recovered and sent to the DMD or other imaging device, for example, as diffuse light. Whether or not light from the DC spot is directed to the imaging device and/or an amount of light from the DC spot to be directed to the imaging device is controlled on a frame-by frame or a field-by-field basis in some embodiments. The control may be based on a power level calculated for a field or frame. For higher power levels (brighter images) light from the DC spot may be directed to the imaging device whereas for lower power levels less or no light from the DC spot may be directed to the imaging device. A wide range of optical systems may be used to carry light from the DC spot to the imaging device. In some embodiments an arrangement similar to that shown in FIG. 10 may be used to collect light from the DC spot and combine that light with light that has been modulated by the phase modulator upstream from the imaging device. The optical path for light from the DC spot may include optical elements such as one or more homogenizers or light diffusers to make the added illumination provided by light from the DC spot diffuse at the imaging device. If necessary a polarization shifting element may be provided to alter the polarization of light from the DC spot to facilitate combination of light from the DC spot with light that has been steered by the phase modulator. This technique may be combined with any of the above or used on its own.

The various approaches described herein may be embodied in projectors configured to implement these approaches. Further, any of the described methods for field-sequential imaging may optionally be combined with any of the described methods for providing direct illumination of a light modulator. An LCOS is an example of a phase modulator. Other embodiments may use other types of phase modulator. A DMD is an example of an amplitude modulator. Other embodiments may use amplitude modulators of other types in place of a DMD.

In an example embodiment, video image data is processed to identify a degree of brightness of a frame. If the frame is dark then a phase modulator may be controlled to steer light from a light source onto an amplitude modulator and to control the amplitude modulator to modulate the steered light to display the image specified for the frame. In a frame sequential image this may be done separately for each colour sub-frame. If the frame is bright then the amplitude modulator may be illuminated by light that is not first steered by the phase modulator, either in addition to or instead of light steered by the phase modulator. The amplitude modulator may be controlled to display the (bright) image.

In some example embodiments apparatus as illustrated in any one of FIGS. 11, 12, 13 may be used to provide one of a plurality (e.g. 3 to 6 in some embodiments) of color channels. In some embodiments two or more of or all of the color channels modulate light of the respective color in parallel (i.e. at the same time). In other embodiments some or all of the color channels may operate in a field-sequential manner or a time-interleaved manner. In some cases field-sequential operation is achieved using one of approaches one, two or three which are discussed above for some or all of the color channels.

In some embodiments a plurality of colors from separate color channels which have the general architecture illustrated by FIG. 11, 12 or 13 are emitted simultaneously and combined to provide white light.

Displays as described herein may include other elements not shown for clarity such as: controllers which are configured to control one or more phase modulators and one or more amplitude modulators to display images or other light patterns; inputs or data stores by way of which image data is supplied; light sources (which may comprise lasers, other solid-state light sources, or other light sources entirely); projection lenses; display screens (front or rear projection); other optical elements in light paths (e.g. lenses, mirrors, collimators, diffusers, etc.); power supplies; focusing systems; heat management systems, etc.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using control systems that include specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, video projectors, audio-visual receivers, displays (such as televisions), digital cinema projectors, media players, and other devices suitable for the purposes described herein. Those skilled in the relevant art will appreciate that aspects of the system can be practised with other communications, data processing, or computer system configurations, including consumer electronics (e.g., video projectors, audio-visual receivers, displays, such as televisions, and the like), set-top boxes, network PCs, mini-computers, mainframe computers, and the like.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above. In some embodiments image data is processed by a processor executing software instructions to yield control signals for a phase modulator. The software may execute in real time in some embodiments (other embodiments are also possible).

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. An image projector comprising:
   a light source operable to emit light having separable first and second components;
   a beam splitter arranged to divide the light into a first path carrying light having the first component and a second path carrying light having the second component;
   an optical combiner arranged to combine the light from the first and second paths and to direct the combined light onto an imaging element operative to spatially modulate the combined light;
   a phase modulator located in the first path between the beam splitter and the optical combiner, the phase modulator operable to provide a phase pattern which causes the light having the first component to be selectively steered to desired locations on the imaging element; and
   a projection lens operative to project the combined light that has been modulated by the imaging element;
   an optical homogenizer in the second path between the beam splitter and the imaging element; and
   an aperture in the second path between the optical homogenizer and the imaging element, the aperture controllable to adjust the amount of light from the second path incident on the imaging element.

2. The image projector according to claim 1 wherein the first component is a first polarization component having a first polarization state and the second component is a second polarization component having a second polarization state.

3. The image projector according to claim 1 wherein the imaging element comprises an amplitude modulator.

4. The image projector according to claim 3 wherein the amplitude modulator comprises a DMD.

5. The image projector according to claim 1 wherein the phase modulator comprises an LCOS phase modulator.

6. The image projector according to claim 1 wherein the light from the first and second paths is incident on the imaging element from the same angle of incidence.

7. The image projector according to claim 1 wherein the light source comprises a fiber-coupled light emitting diode.

8. The image projector according to claim 2 wherein the first polarization component is a P-polarized component and the second polarization component is an S-polarized component.

9. The image projector according to claim 1 wherein the optical combiner comprises a color beam splitter.

10. The image projector according to claim 1 wherein the optical combiner comprises a dichroic mirror.

11. The image projector according to claim 1 wherein the optical homogenizer comprises a fly's eye lens array.

12. The image projector according to claim 1 wherein the light source comprises a source of blue light.

13. The image projector according to claim 1 comprising a controller operative to control an output of the light source in response to image data.

14. The image projector according to claim 1 comprising a controller configured to process video image data to identify a degree of brightness of a frame and, if the frame is dark to control the phase modulator to steer light from the first path onto the imaging element and to control the imaging element to modulate the steered light to display an image specified for the frame.

15. The image projector according to claim 14 wherein the controller is further configured to, if the frame is bright, cause the imaging element to be illuminated by light that has not been steered by the phase modulator.

16. The image projector according to claim 2 comprising a polarizer mounted for rotation, the polarizer located to polarize light between the light source and the beam splitter.

17. The image projector according to claim 1 wherein the imaging element comprises an amplitude modulator configured to restore finer details of a target image.

18. The image projector according to claim 1 wherein the imaging element is part of a refinement module and the refinement module comprises a de-speckling module.

19. The image projector according to claim 1 wherein the imaging element is part of a refinement module and the refinement module comprises a polarization-varying device.

20. An image projector comprising:
    a light source operable to emit light having separable first and second components;
    a beam splitter arranged to divide the light into a first path carrying light having the first component and a second path carrying light having the second component;
    an optical combiner arranged to combine the light from the first and second paths and to direct the combined light onto an imaging element operative to spatially modulate the combined light;
    a phase modulator located in the first path between the beam splitter and the optical combiner, the phase modulator operable to provide a phase pattern which causes the light having the first component to be selectively steered to desired locations on the imaging element; and
    a projection lens operative to project the combined light that has been modulated by the imaging element
    wherein the imaging element is part of a refinement module and the refinement module is operative to provide high spatial frequency detail to a light-field provided by the combined light that has been modulated by the imaging element.

21. The image projector according to claim 20 wherein the refinement module is operative to minimize visual artifacts introduced by the phase modulator into the combined light.

22. The image projector according to claim 21 comprising a unit configured to analyse the light from the first path.

23. The image projector according to claim 20 comprising an array of integration rods in the first path between the phase modulator and the imaging element.

24. A color image projector comprising a plurality of channels, each of the channels comprising:
   an imaging element;
   a light source operable to illuminate the imaging element with light having separable first and second components;
   a beam splitter arranged to divide the light into a first path carrying light having the first component and a second path carrying light having the second component;
   a phase modulator located in the first path between the beam splitter and the imaging element, the phase modulator operable to provide a phase pattern which causes the light from the first path to be steered to desired locations on the imaging element;
   an optical combiner arranged upstream from the imaging element and configured to combine the light from the first path with light from the second path such that the imaging element is illuminated by light of the first component and the light of the second component;
   an optical homogenizer in the second path between the beam splitter and the imaging element; and
   an aperture in the second path between the optical homogenizer and the imaging element, the aperture controllable to adjust the amount of light from the second path incident on the imaging element;
   the color image projector further comprising:
      an optical system including a projection lens, the optical system operative to combine light that has been modulated by the imaging elements of the plurality of channels and to project the combined light.

25. The color image projector according to claim 24 wherein the first component is a first polarization component having a first polarization state and the second component is a second polarization component having a second polarization state.

26. The color image projector according to claim 24 wherein the plurality of channels comprise a red channel, a green channel and a blue channel and the light source comprises a red light emitting diode, a green light emitting diode and a blue light emitting diode for the red, green and blue channels respectively.

* * * * *